(12) United States Patent
Miller et al.

(10) Patent No.: US 7,337,239 B2
(45) Date of Patent: Feb. 26, 2008

(54) ATOMIC MESSAGE DIVISION

(75) Inventors: Quentin S. Miller, Sammanish, WA (US); Donald J. McNamara, Woodinville, WA (US); Avner Sander, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1354 days.

(21) Appl. No.: 10/300,138

(22) Filed: Nov. 19, 2002

(65) Prior Publication Data

US 2004/0103141 A1 May 27, 2004

(51) Int. Cl.
*G06F 15/16* (2006.01)

(52) U.S. Cl. ............. 709/248; 709/203; 709/217; 709/229; 709/232

(58) Field of Classification Search ........... 709/203, 709/217, 229, 232, 248
See application file for complete search history.

(56) References Cited

U.S. PATENT DOCUMENTS

| | | | | |
|---|---|---|---|---|
| 6,393,434 B1* | 5/2002 | Huang et al. | ............... | 707/200 |
| 7,013,315 B1* | 3/2006 | Boothby | ............... | 707/203 |
| 7,076,567 B1* | 7/2006 | Chasman et al. | ............ | 709/248 |
| 2003/0167318 A1* | 9/2003 | Robbin et al. | ............... | 709/248 |
| 2003/0233383 A1* | 12/2003 | Koskimies | ............... | 707/204 |
| 2005/0099963 A1* | 5/2005 | Multer et al. | ............... | 370/254 |
| 2006/0248232 A1* | 11/2006 | Chasman et al. | ............ | 709/248 |

FOREIGN PATENT DOCUMENTS

| | | |
|---|---|---|
| EP | 0964 559 | 12/1999 |
| EP | 1 016 987 | 5/2000 |

* cited by examiner

*Primary Examiner*—Phuoc Nguyen
(74) *Attorney, Agent, or Firm*—Workman Nydegger (57) ABSTRACT

Synchronizing a client and server version of a hierarchical data structure having several atomically-editable components. At synchronization time, the server identifies all of the changes that need to occur to the client version in order to properly synchronize the client version of the hierarchical document with the server version. Each of the changes involves edits of one or more of the atomically-editable components of the data structure. The server fragments the synchronization information into multiple messages, and then individually sends the message to the client computing system. The client atomically processes each of the messages. For each change to be made as identified within a single message, the client computing system identifies the atomically-editable components that are involved by the change, and then edits (e.g., inserts, changes, or deletes) the atomically-editable components in a specified manner.

32 Claims, 4 Drawing Sheets

ATOMIC MESSAGE DIVISION

BACKGROUND OF THE INVENTION

1. The Field of the Invention

The present invention relates to network communications technology, and more specifically, to mechanisms for splitting a synchronization message into multiple atomically processable components.

2. Background and Related Art

Computing technology has revolutionized the way people work and play and has contributed enormously to the advancement of humankind. Computers now aid in enumerable applications such as word processing, computer simulations, advanced gaming, voice recognition, among much more. Computing systems now come in a wide-variety of forms including, for example, desktop computers, laptop computers, Personal Digital Assistants (PDAs), and even mobile telephones and devices.

Some mobile wireless devices such as Personal Digital Assistants and wireless telephones have sophisticated memory and general processing capability that allow the mobile device to perform many tasks previously only performed by larger desktop computers. These tasks may even include tasks that require communication over data networks. This allows users to access the Internet and perform e-mail tasks even while they are mobile. Nevertheless, despite such sophisticated handheld computing systems, memory tends to be much more limited in smaller devices as compared to larger desktop or even laptop computing systems.

Since the amount of system memory is relatively limited, the amount of memory allocated to a receive buffer may also be quite small. If the communication is larger, as tends to be the case when synchronizing hierarchical data structures, the communication may be larger than the receive buffer. This results in some of the communication being lost resulting in some cases in a complete loss in ability to process the communication.

Accordingly, what is desired are mechanisms for synchronizing hierarchical data structures for accommodating receive buffers that may be too small to accommodate all of the synchronization information in a single message.

BRIEF SUMMARY OF THE INVENTION

The foregoing problems with the prior state of the art are overcome by the principles of the present invention, which are directed towards mechanisms that synchronize a version of a hierarchical data structure stored on a client computing system, and a version of the hierarchical data structure stored on a server. The synchronization may occur even though a receive buffer of the client computing system cannot contain a single message that has all of the changes needed to synchronize. The hierarchical data structure has several atomically-editable components that may be separately addressable, and may even have their own change tracking information After determining that synchronization is to occur, the server identifies all of the changes that need to occur to the client version in order to synchronize the client version of the hierarchical document with the server version of the hierarchical document. Each of the changes involves edits (e.g., insertions, changing, or deletion) of one or more of the atomically-editable components of the data structure. If the server estimates that a single message that contains all of the plurality of changes cannot be contained within a receive buffer of the client computing system, then the server fragments the synchronization information into multiple messages.

Unlike conventional fragmentation techniques, each of the individual messages may be atomically processed upon receipt to perform partial synchronization. In other words, if the synchronization information were split into two atomically-processable messages, and if only one of the messages were received and processed, the hierarchical data structure still conforms with the schema and applications that work with that structure are still able to operate upon the data structure.

The server assembles a first message that contains a first group of less than all of the synchronization changes, and also assembles one or more other messages that each contain other synchronization changes. The messages, when viewed as a whole, contain all of the synchronization changes, though none of them individually contain all the synchronization changes. Accordingly, each individual message is smaller thereby more likely fitting into the receive buffer of the client computing system.

Each message is then independently sent to the client computing system. The client computing system may then process each of the messages atomically. For each change to be made as identified within a single message, the client computing system identifies the atomically-editable components that are involved by the change, and then edits (e.g., inserts, changes, or deletes) the atomically-editable components in a manner specified by the change. Since the changes involve atomically-editable components of the hierarchical data structure, the changes can be implemented even without having all of the synchronization changes. Accordingly, there is no need to cache any of the messages (assuming they arrive in proper order). Each of the messages are received, processed, and then dropped, even though none of the messages represents all of the changes to be made.

Some caching may occur, however, if a message is received that has later changes than a message that is not yet received. In that case, the message that contains the later changes may be cached until the message that contains the earlier changes is received and processed. This may be a relatively rare occurrence since the server may likely dispatch the message with the earlier changes first before transmitting the message with the later changes. After all, messages typically arrive in the order they are transmitted.

In this manner, communications are not dropped due to insufficient receive buffer size. Furthermore, changes can be processed as they are received even though full synchronization is not yet accomplished. If some of the message were not received, only those messages that were not received need be transmitted thereby preserving network bandwidth. Alternatively, it may be easier from an implementation standpoint to just send those messages starting with the first missed message (even if some of the messages after the first missed message were already received and not missed at all). Either way, fewer messages need be transmitted.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention related to mechanisms that synchronize a version of a hierarchical data structure stored on a client computing system, and a version of the hierarchical data structure stored on a server computing system. The hierarchical data structure has several atomically-editable components that may be separately addressable. After determining that synchronization is to occur, the server identifies all of the changes that need to occur to the client version in order to synchronize the client version of the hierarchical document with the server version of the hierarchical document. Each of the changes involves edits (e.g., insertions, changing, or deletion) of one or more of the atomically-editable components of the data structure. If the server determines that a single message that contains all of the plurality of changes cannot be contained within a receive buffer of the client computing system, then the server fragments the synchronization information into multiple messages, and then individually sends the message to the client computing system.

The client computing system may then process each of the messages atomically. For each change to be made as identified within a single message, the client computing system identifies the atomically-editable components that are involved by the change, and then edits (e.g., inserts, changes, or deletes) the atomically-editable components in a manner specified by the change. Since the changes involve atomically-editable components of the hierarchical data structure, the changes can be implemented even without having all of the synchronization changes.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code.

Figure 1:
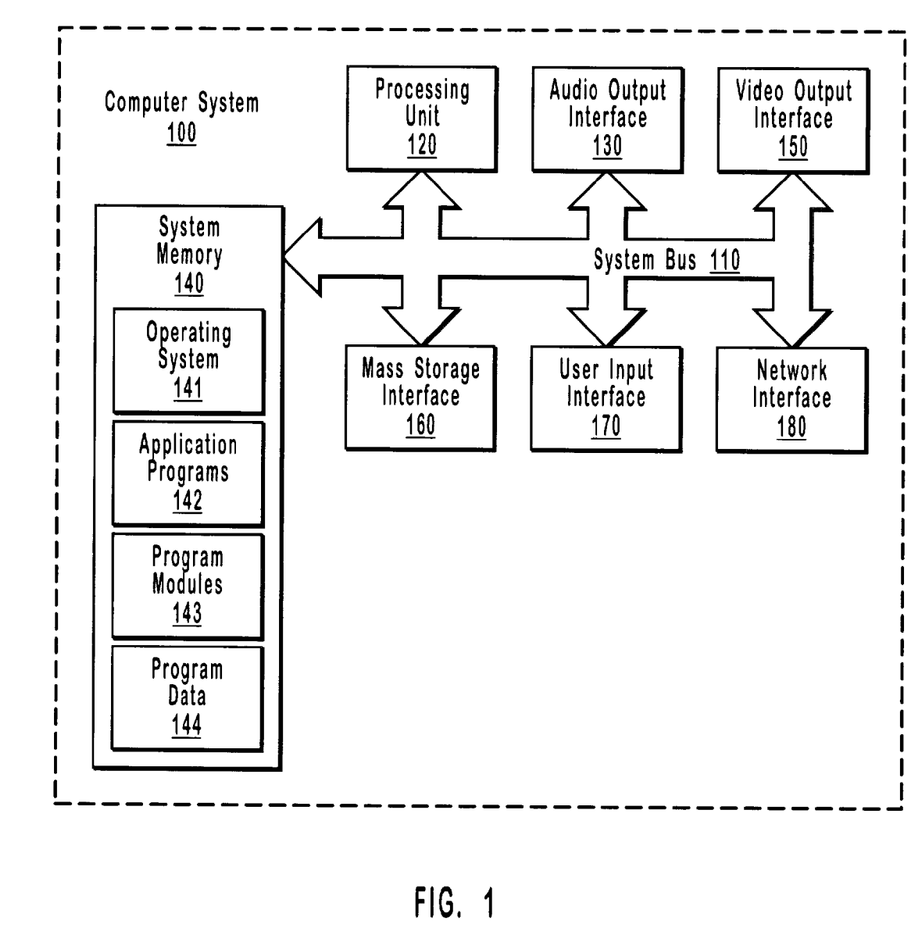
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein.

Computer system 100 includes a user input interface 170 that receives information from an input device, such as, for example, a keyboard, microphone, mouse, or in the case of a smaller mobile device, a touch pad. An input device can be coupled to user input interface 170 so as to enable the entry of information. An input device may transfer information over such a coupling in response to preprogrammed data or user manipulation of the input device.

Computer system 100 includes a video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal. In the case of a smaller mobile device, the video output interface may interface with a smaller display.

Similarly, computer system 100 includes an audio output interface 130 that provides an audio output signal to external audio output devices. Computer system 100 may also be integrally positioned with or separate from an audio system, which may include a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 may include mass storage interface 160, which can read data from and/or write data to a mass storage device, such as, for example, a magnetic disk or optical disk. A mass storage device can be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device. A smaller mobile device, however, may not have any such mass storage.

Computer system 100 is connectable to networks, such as, for example, an office-wide or enterprise-wide computer network, an intranet, the Internet, and/or a carrier network. Computer system 100 includes network interface 180, through which computer system 100 receives data from external sources and/or transmits data to external sources. Computer system 100 may exchange data with external sources, such as, for example, remote processor systems and/or databases over such a network.

While FIG. 1 illustrates an example of a computing system that may implement the principles of the present invention, any computing system may implement the features of the present invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
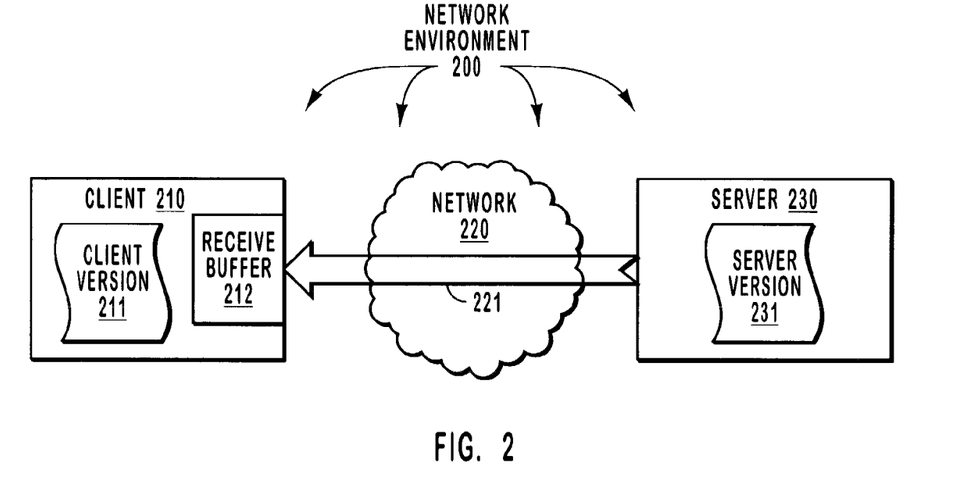
FIG. 2 illustrate a hierarchical data structure that has atomically-editable components.

FIG. 2 illustrates a network environment 200 in which the principles of the present invention may operate. The network environment 200 includes a client computing system 210 and a server computing system 230 communicating over a network 220. The client computing system 210 may be a relatively limited memory device that has only a relatively small receive buffer 212. One example of such a device might be a mobile telephone or a mobile Personal Digital Assistant (PDA). The client computing system 210 and the server computing system 230 may each be structured as described above with respect to computer system 100. If the client computing system 210 were the computer system 100, the receive buffer 212 may be allocated from the system memory 140.

The server computing system 230 and the client computing system 210 may be capable of communicating bi-directionally. However, when the server computing system 230 communicates to the client computing system 210, the server computing system 230 sends message to the clients receive buffer as represented by arrow 221. This communication is performed, for example, when synchronizing a client version 211 of a hierarchical data structure with a server version 231 of a hierarchical data structure.

In this description and in the claims, a "hierarchical data structure" may be any data structure that contains data fields arranged in a parent-child hierarchical structure. One example of a format that permits such hierarchical organization is extensible Markup Language (XML).

Figure 3:
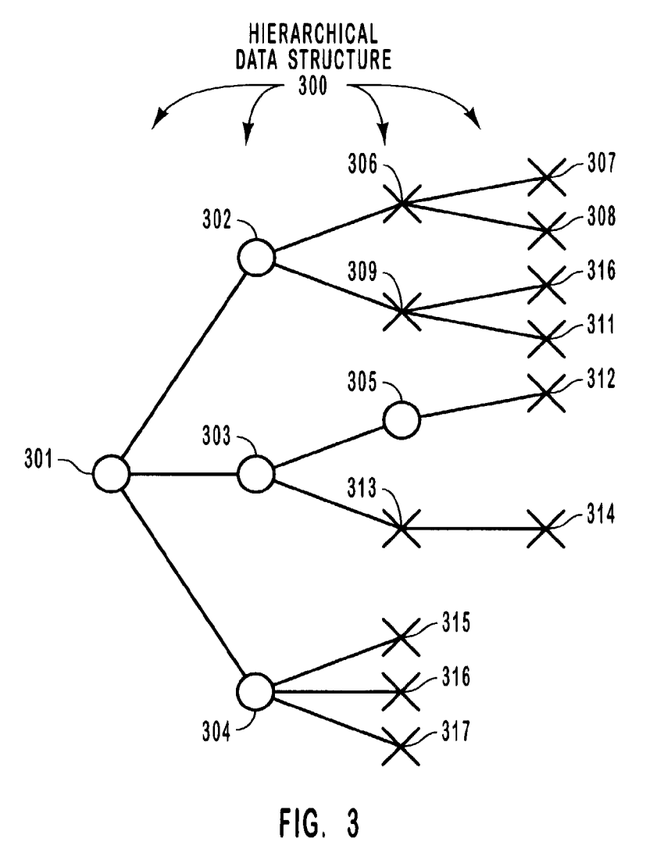
FIG. 3 illustrates a network environment in which a client and a server each have access to a version of the hierarchical data structure, wherein further changes have been performed against the server version of the hierarchical data structure.

Although hierarchical documents may take a wide variety of hierarchical forms, FIG. 3 illustrates a specific schematic representation of a hierarchical data structure 300 in which each node in the hierarchical data structure is represented by either a circle or a cross.

The nodes represented by circles (i.e., nodes 301 through 305) represent those nodes that may be atomically-edited. In other words, each of the atomically-editable nodes may be edited (e.g., inserted, changed, or deleted) without affecting the other nodes in the hierarchical tree. Optionally, each of the atomically-editable nodes may also have change tracking information that allows for changes to be expressed in terms of the edits to the specific atomically-editable node.

The nodes represented by crosses (i.e., nodes 306 through 317) represent nodes that are not atomically-editable. In order to edit the nodes 306-317, one would edit a corresponding atomically-editable node in the ancestral line of the hierarchical data structure. For example, in order to edit the node 308, one would edit instead the entire node 302. In some cases, it may be desirable to limit which nodes are atomically-editable so as to limit the amount of processing and memory resources needed to maintain the hierarchical data structure. An example of a data model that uses such hierarchical data structures is described in commonly-owned co-pending U.S. patent application Ser. No. 10/003,753, which application is incorporated herein by reference in its entirety. Although the data structure 300 has some nodes that are atomically-editable and some that are not, the principles of the present invention may also be applied to a data structure in which all of the nodes in the data structure are atomically-editable.

Figure 4:
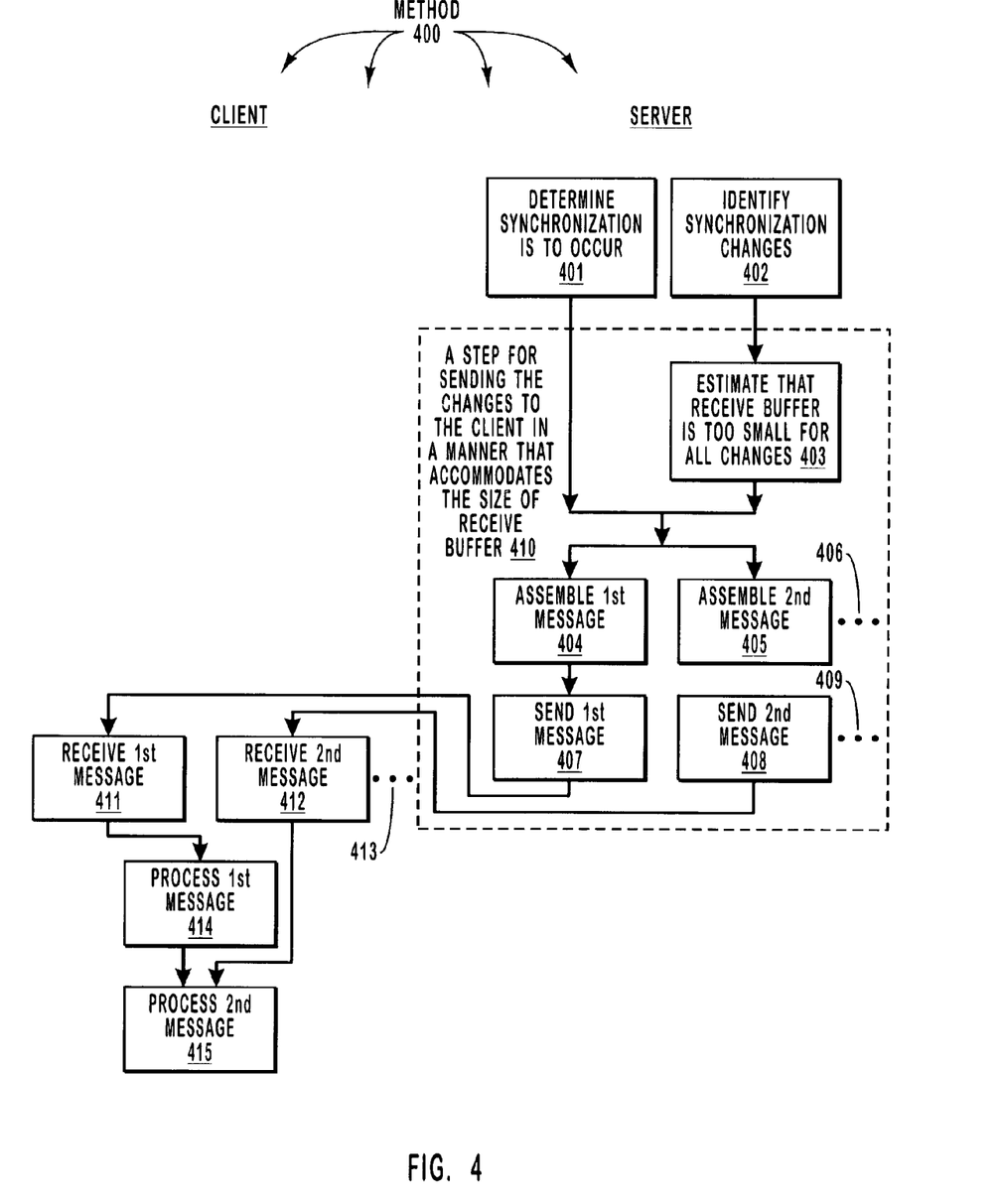
FIG. 4 illustrates a method for synchronizing the client and server versions of the hierarchical data structure in accordance with the principles of the present invention.

FIG. 4 illustrates a flowchart of a method 400 for synchronizing the server version and the client version of the hierarchical data structure in accordance with the principles of the present invention. A step and several acts that are performed by the server are illustrated in the right column of method 400 under the heading "SERVER". On the other hand, several acts that are performed by the client are illustrated in the left column of method 400 under the heading "CLIENT".

The server determines that a synchronization is to occur between the server version and the client version of the hierarchical data structure (act 401). This determination might be made in response to the client sending a request to synchronize to the server. Alternatively, the server may determine that synchronization is to occur based on its own state information without having received a synchronous request from the client. For example, the server may periodically synchronize, or may synchronize after the server version has been changed a predetermined number of times, or the like.

The server also identifies synchronization changes that are to be applied to the client version of the hierarchical data structure (act 402). Acts 401 and 402 are shown in parallel to emphasize that there is no time dependence between the two acts. For example, the server may continuously be identifying synchronization changes as they occur, regardless of whether synchronization is to be imminently performed.

The synchronization changes may be identified by, for example, comparing a change identifier representing a state of the client version of the hierarchical data structure with a change identifier representing a state of the server version of the hierarchical data structure. The change identifier representing the state of the client version may have been received from the client itself, or may have been updated and cached by the server the last time a synchronization occurred.

The method 400 then includes a functional, result-oriented step for sending the changes to the client computing system in a manner that accommodates the size of a receive buffer (step 410). This step may include any corresponding acts for accomplishing this step. However, in the illustrated embodiment, step 410 includes specific corresponding acts 404 through 409.

More specifically, the server estimates that a single message that contains all of the plurality of changes cannot be contained within the receive buffer of the client computing system (act 403). In order to accomplish this, the server may estimate an approximate size of a single message that contains all of the changes, estimate an approximate size of the receive buffer of the client computing system, and then determine that the size of the receive buffer is greater than (or at least dangerously close to) the size of the single message. The client may have previously registered information with the server that either expressly lists the receive buffer size, or gives enough information that a reasonable estimate of the receive buffer size may be inferred. For example, if the client were a specific brand of wireless device that consistently has the same receive buffer size across devices of the same brand, then the receive buffer size may be inferred based on the brand of the wireless device. Alternatively, the size of the receive buffer may be expressed within any request to synchronize received from the client.

The server then assembles a number of messages that each contains less than all of the synchronization changes. For example, the server assembles a first message that contains a first group of less than all of the changes (act 404), assembles a second message that contains a second group of at least of portion of the remaining changes that are not part of the first group (act 405), and if the second message did not contain all of the rest of the changes, then assembles even more messages as represented by the horizontal ellipses 406.

Figure 5:
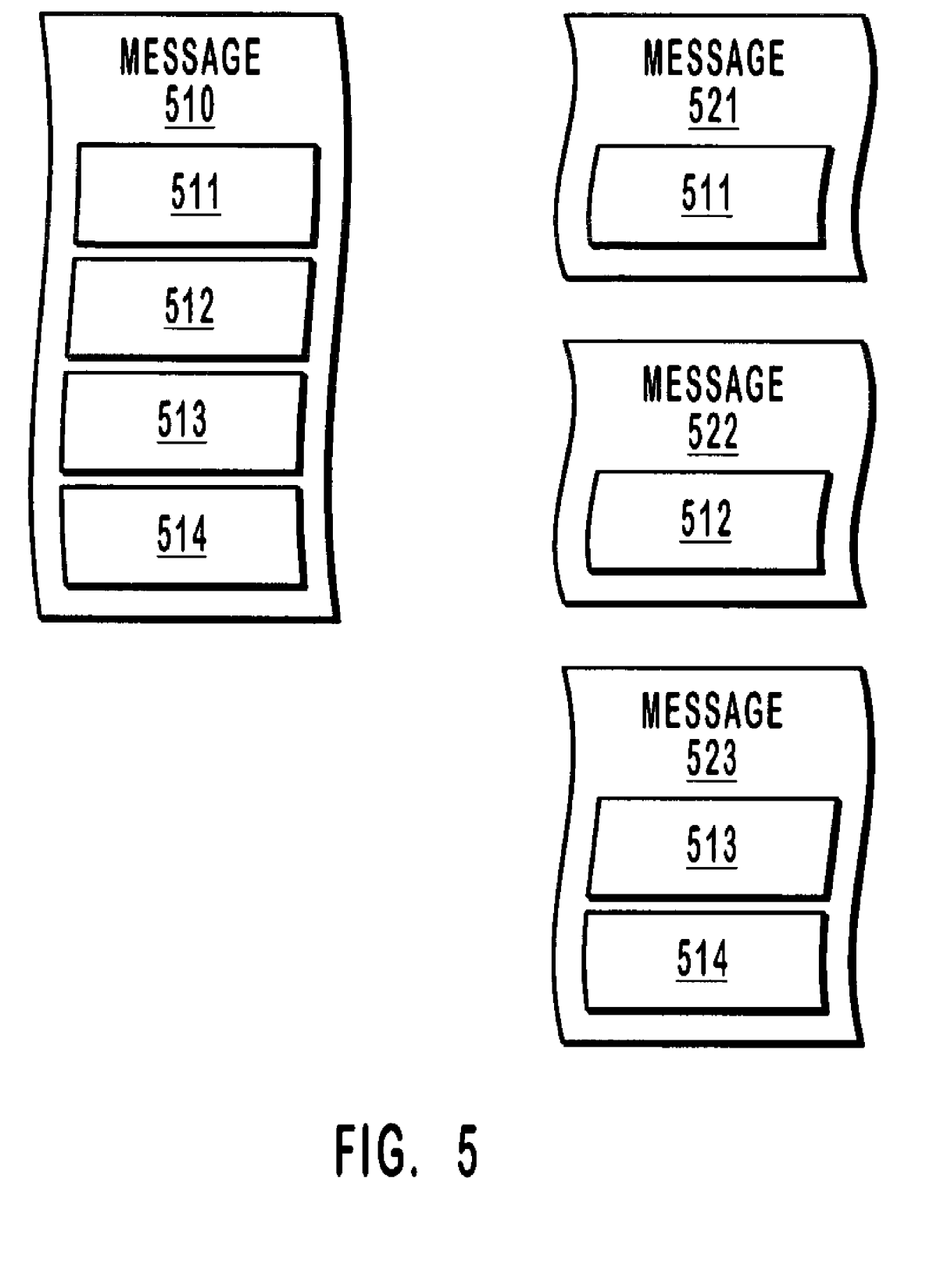
FIG. 5 illustrates an example of a single message that contains all of a number of changes, an alternative in which a series of smaller messages that each contain less than all of the changes.

FIG. 5 illustrates an example of a single message 510 that contains all of a number of changes 511, 512, 513 and 514. FIG. 5 also shows an alternative in which a series of smaller messages that each contain less than all of the changes. For example, message 521 contains only one synchronization change 511, message 522 also contains only one synchronization change 512, and message 523 contains two synchronization changes 513 and 514. The size of any given message 521 through 523 is smaller than the size of the single message 510 and is thus more likely to be received in the receive buffer even if the receive buffer is smaller that the single message 510.

In one example, each of the messages is a Simple Object Access Protocol (SOAP) envelope. When two messages are sent, the header portion of the first SOAP envelope would contain a header portion that correlates the first message with the second message, and contains a body portion that contains the first group of changes. The second SOAP envelope would contain a header portion that correlates the second message with the first message, and contains a body portion that contains the second group of changes.

The server then sends the first and second messages and potentially any further messages that also contain synchronization changes to the client computing system (act 407, 408 and 409, respectively), whereupon the client receives the first and second message and potentially the further messages (act 411, 412 and 413, respectively). The client then processes all of the synchronization changes in the first group of changes received in the first request (act 414) and then processing all of the synchronization changes in the second group of changes (act 415), as well as processing any other changes received in subsequent messages.

In one embodiment, the synchronization changes received in the first messages are to be applied before changes in subsequent messages. Accordingly, if the subsequent message is received before the first message, then the subsequent message may be cached until the first message is received and processed. In the more common case, in which the messages are received in the order they are transmitted, the message may be processed as they are received since the changes applied are atomically-editable into the data structure without making the data structure violate a schema or otherwise corrupting the data structure. Accordingly, the messages may be received, processed, and dropped as they are received rather than attempting to perform the more processor and memory intensive task of reassembling all of the changes once they are received, and then applying the changes in one transactional process.

Although the principles of the present invention are by no means limited to the messages being SOAP envelopes, the following SOAP envelope shows one example of what a message would look like if it were to contain three different synchronization changes. One synchronization change is to delete a node having an identifier of 7, another is to edit a node having an identifier of 5, and yet another is to delete another node having an identifier of 12. If all of these changes were provided in a single example message, that example message might appear as follows:

```
1.   <s:Envelope>
2.       <s:Header>
3.           <srp:path>
4.               <srp:from>"http://mywidgets.mobile.msn.com"</srp:from>
5.               <srp:id>23</srp:id>
6.               <srp:relatesTo>202</srp:relatesTo>
7.           </srp:path>
8.           <ss:license>"1f2e3d4c5b6a"</ms:license>
9.           <ms:response service= "myWidgets" previousChangeNumber="8"
                   changeNumber= "11"/>
10.      </s:Header>
11.      <s:Body>
12.          <ms:queryResponse>
13.              <ms:changeQueryResponse baseChangeNumber= "11"
                       status="success">
14.                  <ms:deletedBlue id="7" changeNumber="9"/>
15.                  <m:widget id= "5" changeNumber="10">
16.                      <m:name xml:lang="en">Widget 5</m:name>
17.                      <m:unitPrice currency="USD">128.00
                             </m:unitPrice>
18.                  </m:widget>
19.                  <ms:deletedBlue id="12" changeNumber="11"/>
20.              </ms:changeQueryResponse>
21.          </ms:queryResponse>
22.      </s:Body>
23.  </s:Envelope>
```

In this request, lines 1 through 23 are the entire SOAP envelope. Lines 2 through 10 represent the header portion of the SOAP envelope, while lines 11 through 22 represent the body of the SOAP envelope. As for the header portion, lines 3-7 define a specific path that the message is to take, and line 8 represents license information. Line 9 identifies a previous change number and a change number that would be applied to the hierarchical data structure once the changes are fully implemented. Accordingly, the change number of the data structure before application of the changes would be 8, while the change number after the changes are applied would be 11. The message thus contains all three changes identified by 9, 10, and 11. The first change is represented in the body of the SOAP envelope at line 14. The second change is represented at lines 15-18. The third change is represented at line 19.

The single example SOAP envelope may be too big for a receive buffer if all three changes 9, 10 and 11 are included within the same SOAP envelope. Accordingly, the following illustrates three specific SOAP envelopes, each containing only one of the changes. The following illustrates a first SOAP envelope that contains the first change:

```
1.   <s:Envelope>
2.       <s:Header>
3.           <srp:path>
4.               <srp:from> "http://mywidgets.mobile.msn.com"</srp:from>
5.               <srp:id>23</srp:id>
6.               <srp:relatesTo>202</srp:relatesTo>
7.           </srp:path>
8.           <ss:license>"1f2e3d4c5b6a"</ms:license>
9.           <ms:response service="myWidgets" previousChangeNumber= "8"
                   changeNumber="9"/>
10.      </s:Header>
11.      <s:Body>
12.          <ms:queryResponse>
13.              <ms:changeQueryResponse baseChangeNumber="11"
                       status="success">
14.                  <ms:deletedBlue id="7" changeNumber="9"/>
15.              </ms:changeQueryResponse>
16.          </ms:queryResponse>
17.      </s:Body>
18.  </s:Envelope>
```

This first fragmented SOAP envelope is similar to the single example SOAP envelope, except that line 9 identifies that the current change number would be 9 if all of the changes are applied. Furthermore, the body only contains change 9, which was the deletion of the node having identifier 7.

The second fragment is as follows:

```
1.   <s:Envelope>
2.       <s:Header>
3.           <srp:path>
4.               <srp:from>"http://mywidgets.mobile.msn.com"</srp:from>
5.               <srp:id>24</srp:id>
6.               <srp:relatesTo>202</srp:relatesTo>
7.           </srp:path>
8.           <ss:license>"1f2e3d4c5b6a"</ms:license>
9.           <ms:response service="myWidgets" previousChangeNumber="9"
                   changeNumber="10"/>
10.      </s:Header>
11.      <s:Body>
12.          <ms:queryResponse>
13.              <ms:changeQueryResponse baseChangeNumber="11"
                       status="success">
14.                  <m:widget id="5" changeNumber="10">
15.                      <m:name xml:lang="en">Widget 5</m:name>
16.                      <m:unitPrice currency="USD">128.00
                             </m:unitPrice>
17.                  </m:widget>
18.              </ms:changeQueryResponse>
19.          </ms:queryResponse>
20.      </s:Body>
21.  </s:Envelope>
```

This second fragmented SOAP envelope is similar to the single example SOAP envelope, except that line 9 identifies that the current change number would be 10 if all of the changes are applied, and that the previous change number is 9. Accordingly, this second fragment would be applied to the client version after the first fragment was applied. Furthermore, the body only contains change 10, which was the editing of the node having identifier 5.

The third fragment is as follows:

```
1.   <s:Envelope>
2.       <s:Header>
3.           <srp:path>
4.               <srp:from>"http://mywidgets.mobile.msn.com"</srp:from>
5.               <srp:id>25</srp:id>
6.               <srp:relatesTo>202</srp:relatesTo>
7.           </srp:path>
8.           <ss:license>"1f2e3d4c5b6a"</ms:license>
9.           <ms:response service="myWidgets" previousChangeNumber="10"
                   changeNumber="11"/>
10.      </s:Header>
11.      <s:Body>
12.          <ms:queryResponse>
13.              <ms:changeQueryResponse baseChangeNumber="11"
                       status="success">
14.                  <ms:deletedBlue id="12" changeNumber="11"/>
15.              </ms:changeQueryResponse>
16.          </ms:queryResponse>
17.      </s:Body>
18.  </s:Envelope>
```

This third fragmented SOAP envelope is similar to the single example SOAP envelope, except that line 9 identifies that the current change number would be 11 if all of the changes are applied, and that the previous change number is 10. Accordingly, this third fragment would be applied to the client version after the second fragment was applied. Furthermore, the body only contains change 11, which was the deletion of the node having identifier 12.

This SOAP envelope example is provided by way of providing a practical example of the principles of the present invention. However, the principles of the present invention are not limited by any means to such examples. Furthermore, although the example fragmented SOAP messages are only marginally smaller than the example single SOAP message (e.g., 18, 21 and 18 lines of XML code as compared to 23 lines of XML code), if the number of changes were larger, then the size reduction would be more significant.

Accordingly, the principles of the present invention provide a mechanism whereby synchronization changes may be communicated from a server to a client is smaller fragments that accommodate the receive buffer without having to incur significantly more processing and memory capability typically needed to reassemble the changes and then apply the changes on a transactional basis.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer network that includes a server computing system and a client computing system, the server computing system and the client computing system each containing a version of a hierarchical data structure that contains a plurality of atomically-editable components, a method for the server computing system synchronizing the server version and the client version of the hierarchical data structure even though a receive buffer of the client computing system has insufficient memory to simultaneously contain a single message that has all of the synchronization data used to synchronize the server version and the client version, the method comprising the following:

an act of determining that a synchronization is to occur between the server version and the client version of the hierarchical data structure;

an act of identifying a plurality of changes that would need to occur if synchronization were to occur, each of the plurality of changes involving changes to one or more of the atomically-editable components;

an act of estimating that a single message that contains all of the plurality of changes cannot be contained within a receive buffer of the client computing system;

an act of assembling a first message that contains a first group of less than all of the plurality of changes by constructing a first Simple Object Access Protocol (SOAP) envelope that contains a header portion that correlates the first message with a second message, and that contains a body portion that contains the first group of changes;

an act of assembling a second message that contains a second group of at least of portion of the plurality of changes that are not part of the first group by constructing a second SOAP envelope that contains a header portion that correlates the second message with the first message, and that contains a body portion that contains the second group of changes;

an act of sending the first message to the client computing system; and an act of sending the second message to the client computing system.

2. A method in accordance with claim 1, wherein the second group does not contain all of the plurality of changes that are not part of the first group, the method further comprising the following:

an act of assembling one or more other message that contain the plurality of changes that were not in the first or second group.

3. A method in accordance with claim 1, wherein the act of determining that a synchronization is to occur between the server version and the client version of the hierarchical data structure comprises the following:

an act of receiving a request to synchronize from the client computing system.

4. A method in accordance with claim 1, wherein the act of determining that a synchronization is to occur between the server version and the client version of the hierarchical data structure comprises the following:

an act of the server computing system determining that synchronization is to occur based on its own state information without having received a synchronous request for synchronization from the client computing system.

5. A method in accordance with claim 1, wherein the act of identifying a plurality of changes that would need to occur if synchronization were to occur comprises the following;

an act of comparing a change identifier representing a state of the client version of the hierarchical data structure with a change identifier representing a state of the server version of the hierarchical data structure.

6. A method in accordance with claim 5, further comprising the following:

an act of receiving the change identifier representing a state of the client version of the hierarchical data structure from the client computing system.

7. A method in accordance with claim 5, further comprising the following:

an act of obtaining the change identifier representing a state of the client version of the hierarchical data structure from a local database.

8. A method in accordance with claim 1, wherein the act of estimating that a single message that contains all of the plurality of changes cannot be contained within a receive buffer of the client computing system comprises the following:

an act of estimating a size of the single message;

an act of estimating a size of the receive buffer of the client computing system; and an act of estimating that the size of the single message is greater than the size of the receive buffer.

9. A method in accordance with claim 8, wherein the act of estimating a size of the receive buffer of the client computing system comprises the following:

an act of receiving an indication of the size of the receive buffer from the client computing system; and an act of estimating that the size of the receive buffer is as specified by the client computing system.

10. A computer program product for use in a computer network that includes a server computing system and a client computing system, the server computing system and the client computing system each containing a version of a hierarchical data structure that contains a plurality of atomically-editable components, the computer program product for implementing a method for the server computing system synchronizing the server version and the client version of the hierarchical data structure even though a receive buffer of the client computing system has insufficient memory to simultaneously contain a single message that has all of the synchronization data used to synchronize the server version and the client version, the computer program product comprising one or more computer-readable media having thereon the following:

computer-executable instructions for determining that a synchronization is to occur between the server version and the client version of the hierarchical data structure;

computer-executable instructions for identifying a plurality of changes that would need to occur if synchronization were to occur, each of the plurality of changes involving changes to one or more of the atomically-editable components;

computer-executable instructions for estimating that a single message that contains all of the plurality of changes cannot be contained within a receive buffer of the client computing system;

computer-executable instructions for assembling a first message that contains a first group of less than all of the plurality of changes by constructing a first Simple Object Access Protocol (SOAP) envelope that contains a header portion that correlates the first message with a second message, and that contains a body portion that contains the first group of changes;

computer-executable instructions for assembling a second message that contains a second group of at least of portion of the plurality of changes that are not part of the first group by constructing a second SOAP envelope that contains a header portion that correlates the second message with the first message, and that contains a body portion that contains the second group of changes;

computer-executable instructions for causing the first message to be sent to the client computing system; and computer-executable instructions for causing the second message to be sent to the client computing system.

11. A computer program product in accordance with claim 10, wherein the computer-executable instructions for determining that a synchronization is to occur between the server version and the client version of the hierarchical data structure comprise the following:

computer-executable instructions for detecting receipt of a request to synchronize from the client computing system.

12. A computer program product in accordance with claim 10, wherein the computer-executable instructions for determining that a synchronization is to occur between the server version and the client version of the hierarchical data structure comprise the following:

computer-executable instructions for the server computing system determining that synchronization is to occur based on its own state information without having received a synchronous request for synchronization from the client computing system.

13. A computer program product in accordance with claim 10, wherein the computer-executable instructions for identifying a plurality of changes that would need to occur if synchronization were to occur, each of the plurality of changes involving changes to one or more of the atomically-editable components comprise the following;

computer-executable instructions for comparing a change identifier representing a state of the client version of the hierarchical data structure with a change identifier representing a state of the server version of the hierarchical data structure.

14. A computer program product in accordance with claim 13, wherein the one or more computer-readable media further have thereon the following:

computer-executable instructions for detecting receipt of the change identifier representing a state of the client version of the hierarchical data structure from the client computing system.

15. A computer program product in accordance with claim 13, wherein the one or more computer-readable media further have thereon the following:

computer-executable instructions for obtaining the change identifier representing a state of the client version of the hierarchical data structure from a local database.

16. A computer program product in accordance with claim 10, wherein the computer-executable instructions for estimating that a single message that contains all of the plurality of changes cannot be contained within a receive buffer of the client computing system comprise the following:

computer-executable instructions for estimating a size of the single message;

computer-executable instructions for estimating a size of the receive buffer of the client computing system; and computer-executable instructions for estimating that the size of the single message is greater than the size of the receive buffer.

17. A computer program product in accordance with claim 16, wherein the computer-executable instructions for estimating a size of the receive buffer of the client computing system comprise the following:

computer-executable instructions for detecting receipt of an indication of the size of the receive buffer from the client computing system; and computer-executable instructions for estimating that the size of the receive buffer is as specified by the client computing system.

18. A computer program product in accordance with claim 10, wherein the one or more computer-readable media are physical storage media.

19. In a computer network that includes a server computing system and a client computing system, the server computing system and the client computing system each containing a version of a hierarchical data structure that contains a plurality of atomically-editable components, a method for the client computing system synchronizing the server version and the client version of the hierarchical data structure even though a receive buffer of the client computing system has insufficient memory to simultaneously contain a single message that has all of the synchronization data used to synchronize the server version and the client version, the method comprising the following:

after estimating that a single message that contains all of the plurality of changes cannot be contained within a receive buffer of the client computing system, performing an act of receiving a first message that includes a first group of less than all of a plurality of changes needed to synchronize the client version of the hierarchical data structure with the server version of the hierarchical data structure, each of the plurality of changes involving changes to one or more of the atomically-editable components, and wherein the first message is constructed by using a first Simple Object Access Protocol (SOAP) envelope that contains a header portion that correlates the first message with a second message, and that contains a body portion that contains the first group of changes;

an act of processing all of the changes in the first group of changes;

an act of receiving a second message that includes a second group of at least a portion of the plurality of changes that are not part of the first group, each of the plurality of changes involving changes to one or more of the atomically-editable components, and wherein the second message is constructed by using a second SOAP envelope that contains a header portion that correlates the second message with the first message, and that contains a body portion that contains the second group of changes; and an act of processing all of the changes in the second group of changes, wherein the acts of processing all of the changes in the first group and the second group involve the following for each change:

an act of identifying the atomically-editable components that are involved by the change; and an act of editing the atomically-editable components in a manner specified by the change.

20. A method in accordance with claim 19, further comprising the following:
an act of sending a request to synchronize to the server computing system.

21. A method in accordance with claim 19, further comprises the following:
an act of determining that the first group of changes represent changes that are to occur before the second group of changes.

22. A method in accordance with claim 21, wherein the act of determining that the first group of changes represent changes that are to occur before the second group of changes comprises the following:
an act of comparing a change identifier from the first message with a change identifier from the second message.

23. A method in accordance with claim 22, wherein the act of determining that the first group of changes represent changes that are to occur before the second group of changes further comprises the following:
an act of determining that the first message is correlated with the second message.

24. A method in accordance with claim 21, wherein the act of processing all of the changes in the first group of changes occurring before the act of processing all of the changes in the second group of changes.

25. A method in accordance with claim 24, wherein the act of receiving the first message occurs after the act of receiving the second message, the method further comprising the following:
an act of foregoing the act of processing all of the changes in the second group of changes until completion of the act of receiving the first message and the act of processing all of the changes in the first group of changes.

26. A computer program product for use in a computer network that includes a server computing system and a client computing system, the server computing system and the client computing system each containing a version of a hierarchical data structure that contains a plurality of atomically-editable components, the computer program product for implementing a method for the client computing system synchronizing the server version and the client version of the hierarchical data structure even though a receive buffer of the client computing system has insufficient memory to simultaneously contain a single message that has all of the synchronization data used to synchronize the server version and the client version, the computer program product comprising one or more computer-readable media having thereon the following:
computer-executable instructions for estimating that a single message that contains all of the plurality of changes cannot be contained within a receive buffer of the client computing system;
computer-executable instructions for detecting receipt of a first message that includes a first group of less than all of a plurality of changes needed to synchronize the client version of the hierarchical data structure with the server version of the hierarchical data structure, each of the plurality of changes involving changes to one or more of the atomically-editable components, and wherein the first message is constructed by using a first Simple Object Access Protocol (SOAP) envelope that contains a header portion that correlates the first message with a second message, and that contains a body portion that contains the first group of changes;
computer-executable instructions for processing all of the changes in the first group of changes;
computer-executable instructions for detecting receipt of a second message that includes a second group of at least a portion of the plurality of changes that are not part of the first group; each of the plurality of changes involving changes to one or more of the atomically-editable components, and wherein the second message is constructed by using a second SOAP envelope that contains a header portion that correlates the second message with the first message, and that contains a body portion that contains the second group of changes; and
computer-executable instructions for processing all of the changes in the second group of changes, wherein processing all of the changes in the first group and the second group involves the following for each change:
identifying the atomically-editable components that are involved by the change; and
editing the atomically-editable components in a manner specified by the change.

27. A computer program product in accordance with claim 26, wherein the one or more computer-readable media further have thereon the following:
computer-executable instructions for causing a request to synchronize to be sent to the server computing system.

28. A computer program product in accordance with claim 26, wherein the one or more computer-readable media further have thereon the following:
computer-executable instructions for determining that the first group of changes represent changes that are to occur before the second group of changes.

29. A computer program product in accordance with claim 28, wherein the computer-executable instructions for determining that the first group of changes represent changes that are to occur before the second group of changes comprise the following:
computer-executable instructions for comparing a change identifier from the first message with a change identifier from the second message.

30. A computer program product in accordance with claim 29, wherein the computer-executable instructions for determining that the first group of changes represent changes that are to occur before the second group of changes further comprise the following:
computer-executable instructions for determining that the first message is correlated with the second message.

31. A computer program product in accordance with claim 28, wherein the computer-executable instructions for processing all of the changes in the first group of changes occurring are configured to be executed before the computer-executable instructions for processing all of the changes in the second group of changes.

32. A computer program product in accordance with claim 26, wherein the one or more computer-readable media are physical storage media.

* * * * *